United States Patent [19]

Yu et al.

[11] Patent Number: 4,490,560
[45] Date of Patent: Dec. 25, 1984

[54] DECOLORIZING POLYMERS OF EPIHALOHYDRIN

[75] Inventors: Simon H. Yu, North Ridgeville; Daniel A. Versace, Lorain, both of Ohio

[73] Assignee: The B. F. Goodrich Company, Akron, Ohio

[21] Appl. No.: 427,324

[22] Filed: Sep. 29, 1982

[51] Int. Cl.³ .............................................. C07C 41/36
[52] U.S. Cl. .................................... 568/614; 568/615; 568/621; 568/609; 568/611; 560/205; 560/219; 260/465.8 R
[58] Field of Search ............... 568/614, 615, 621, 609, 568/611; 560/219, 205; 260/465.8 R

[56] References Cited

U.S. PATENT DOCUMENTS

| | | | |
|---|---|---|---|
| 2,293,868 | 8/1942 | Toussaint | 568/614 |
| 3,000,963 | 9/1961 | Speranza | 568/621 |
| 3,240,819 | 3/1966 | Gaertner et al. | 568/614 |
| 3,636,163 | 1/1972 | Jenker et al. | 568/614 |
| 3,850,856 | 11/1974 | Dreyfus | 568/623 |
| 3,850,857 | 11/1974 | Dreyfus | 568/614 UY |
| 4,233,202 | 11/1980 | Berger | 549/542 |

FOREIGN PATENT DOCUMENTS 1219335 1/1971 United Kingdom .

OTHER PUBLICATIONS

Merck Index, Merck & Co., Inc., Rahway, N.J., (1976) pp. 657, 1099.
Vail et al., Soluble Silicates, vol. 2, Technology, Reinhold Publishing Corp., N.Y., 1952, p. 569.

*Primary Examiner*—Howard T. Mars
*Attorney, Agent, or Firm*—George A. Kap; Nestor W. Shust

[57] ABSTRACT

Water-clear liquid polymers of epihalohydrin are obtained by passing said polymers or their solutions, that are yellow to dark brown, through a column of amorphous silica.

10 Claims, No Drawings

DECOLORIZING POLYMERS OF EPIHALOHYDRIN

BACKGROUND OF THE INVENTION

Functionally terminated liquid polymers, also referred to herein as telechelic liquid polyethers, are well known commercially. In particular, telechelic epihalohydrin liquid polymers are currently being used as a toughening additive for reinforced unsaturated polyesters and thermoset polyesters, as a component of polyurethanes, as a component of non-solvent adhesives, as an impermeable and weatherable coating, and as an energetic binder in rocket fuels.

U.S. Pat. Nos. 3,850,856 and 3,850,857 describe the preparation of hydroxyl-terminated polymers of epihalohydrins by cationic polymerization thereof in the presence of water or ethylene glycol employing, as a polymerization catalyst or initiator, a trialkyl oxonium salt of an $HMF_6$ acid, wherein M is a Group V element selected from the group consisting of phosphorus, arsenic and antimony. However, the liquid polymer prepared is normally of a yellow to dark brown color. The presence of color in the product is undesirable for certain applications where the color of the finished product is important.

SUMMARY OF THE INVENTION

Polymers of epihalohydrins produced by the cationic polymerization of the monomers employing, as a polymerization catalyst, a trialkyl oxonium salt of an $HMF_6$ acid, wherein M is a Group V element selected from the group consisting of phosphorus, arsenic and antimony, can be rendered essentially colorless by passing the polymer or its solution through amorphous silica.

DETAILED DESCRIPTION OF THE INVENTION

This invention relates to a method for decolorizing certain polymers, the method comprising the step of passing a liquid polymer of an epihalohydrin that is of a yellow to dark brown color through a column of amorphous silica in order to essentially remove the color.

As used herein, the term "telechelic" is applied to the polymers with functionality on the end groups. Examples of such functional end groups are hydroxyl, carboxyl, amine, epoxy, vinyl, acrylic, carbonyl, nitrile, isocyanide and thiol.

As used herein, the term "polymer" includes homopolymers and copolymers. The term "copolymer" is applied to the polymers containing at least two different repeating units. Based on the arrangement of monomer units, copolymers can be random, graft, block and alternating. The term "polyethers" covers a number of polymers in which the repeating unit is connected by a carbon-oxygen bond. Examples of such homopolyethers are polyethylene oxide, polypropylene oxide, polyoxetane, polytetrahydrofuran, poly(1,3-dioxolan), polyformaldehyde, poly(allyl glycidyl ether), poly(n-butyl glycidyl ether), poly(trifluoroethyl glycidyl ether), and poly(trichlorobutylene oxide).

As used herein, the term "epihalohydrin polymers" includes epihalohydrin homopolymers and copolymers. The epihalohydrin monomers useful in preparing the polymers include epichlorohydrin, epibromohydrin, epiiodohydrin, and epifluorohydrin. Suitable comonomers contain 2 to 10 carbon atoms, preferably 2 to 6, and are selected from cyclic ethers such as phenyl glycidyl ether, allyl glycidyl ether, glycidyl methacrylate, 1,2-epoxy-3,3,3-trichloropropane, trichlorobutylene oxide, trifluoroethyl glycidyl ether, oxetane, ethylene oxide, propylene oxide, tetrahydrofuran, 1,3-dioxolan, and the like. Block copolymers of epihalohydrin can also be synthesized from other telechelic polymers, preferably hydroxyl terminated, such as hydroxyl terminated polytetrahydrofuran, polybutadiene, poly(butadiene-styrene), polyethylene oxide, polypropylene oxide, poly(ethylene oxide-propylene oxide), poly(butadiene-acrylonitrile), and the like. In the copolymers, amount of an epihalohydrin can vary from about 1 to 99 parts by weight. In a preferred embodiment, amount of epihalohydrin is in the range of 5 to 90 parts by weight, remainder being the comonomers.

As used herein, the term "liquid polymers" is applied to the polymers having Brookfield viscosity of less than 16,000 Pa.S. at the operating temperature. In reference specifically to polymers of epihalohydrin, this invention is directed to the treatment of such polymers having molecular weight (Mn) in the range of about 250 to 50,000 but preferably 500 to 10,000.

Pursuant to the procedure of the Dreyfuss patents, amount of water or a polyol, such as ethylene glycol, can be varied within certain limits in the preparation of the liquid polyepihalohydrins. Usually, amount of water can be in the range of about 0.03 part to about 5.0 parts and an amount of glycol in the range of about 0.05 part to about 20.0 parts, said parts being by weight, based on the weight of 100 parts of the monomer or monomers being polymerized. However, the best results for producing a polymer having the highest average number of hydroxyl groups per polymer chain and the desired molecular weight, are achieved when the amount of water used is in the preferred range of 0.10 part to 5.0 parts by weight, based on the weight of 100 parts of monomer being polymerized, and amount of glycol is in the preferred range of 0.16 to 18 parts.

The cationic catalyst employed is a trialkyl oxonium salt of an $HMF_6$ acid wherein M is a Group V element selected from the group consisting of phosphorus, arsenic and antimony, such acids being $HPF_6$, $HAsF_6$ and $HSbF_6$. The preferred catalyst is triethyloxonium hexafluorophosphate, $(C_2H_5)_3 O^+PF_6^-$, which is a stable crystalline salt that can be easily handled. These catalysts can be prepared in a number of ways but the most convenient and economical process is that described in U.S. Pat. No. 3,585,277. This process includes mixing a solution of an $HMF_6$ acid with an epoxide selected from the class consisting of the alkylene oxides and the halogen-substituted alkylene oxides, and a dialkyl ether, at low temperatures. The ether employed in the process determines the alkyl groups present in the oxonium salt and one will select the ether for this purpose. Most important, for purposes of this invention, the oxonium salts so obtained are stable toward water. Amount of the cationic polymerization catalyst can vary from about 0.001 to 0.10 part by weight per 100 parts by weight of monomer(s) being polymerized. The preferred amount of catalyst is 0.004 to 0.025 part.

In general, in carrying out the polymerization process, mass or bulk polymerization technique is employed. That is, no solvent or inert diluent is used and the catalyst is added to the monomer containing the necessary quantity of water or glycol. The catalyst can be added all at once but preferably, the catalyst is added incrementally or continuously during the reaction period in order to better control the temperature and rate or reaction. However, it is possible to carry out the polymerization reaction in the presence of from about one part to 50 parts by weight, based on the weight of 100 parts of the monomer being polymerized, of a suitable inert organic solvent or diluent. The use of a solvent provides for more efficient mixing of the reaction materials, reduces viscosity, provides ease in maintaining exothermic control of the reaction mixture and facilitates control of monomeric concentration during polymerization. Suitable inert solvents for use in this invention are the liquid hydrocarbons, such as benzene, toluene, propane, butanes, pentanes, hexane, heptane, cyclohexane, and the like; and chlorinated hydrocarbons such as chlorobenzene, carbon tetrachloride, methylene chloride, and the like.

The temperature used in the polymerization reaction is between about 0° C. and 110° C. However, it is preferred to employ temperatures in the range of about 10° C. to about 80° C., most preferably 20° C. to about 50° C., since, at these temperatures polymers having the most desirable properties are produced. It may be desirable, in many cases, to preheat or precool the contents of the reactor to the desired reaction temperature prior to the addition of catalyst or initiator. The polymerization reaction is exothermic and thus the reaction temperature is readily maintained by the controlled rate of catalyst addition. The time of the reaction will vary from about one to 10 hours.

The polymerization reaction may be carried out at autogenous pressures although superatmospheric pressures of up to 10 atmospheres or more may be employed with some advantage when using the more volatile monomers. Superatmospheric pressures may also be employed with those monomers and/or solvents having the requisite volatilities at reaction temperatures permitting reflux cooling of the reaction mixture.

The liquid polymer prepared according to the above described method is normally of a yellow to dark brown color. Since certain applications require colorless polymers, removing or decolorizing the color bodies in the polymer is a prerequisite.

Pursuant to this invention, amorphous silica is used to decolorize the polymer to the degree where it is water-clear or is essentially colorless. This is accomplished by passing colored polymer or its solution through a column of amorphous silica of sufficient volume to remove the offending color. In excess of 90% of the polymer can be recovered after passing it through a column of amorphous silica.

For a higher molecular weight polymer, it is preferable to dissolve the polymer in a solvent in order to reduce its viscosity sufficiently to facilitate its passage through amorphous silica. The concentration of the polymer solution can vary from about 5 to 99% by weight, preferably greater than 15% by weight. Suitable solvents for the polymer are propyl chloride, toluene, chlorobenzene, benzene, ethyl bromide, chloroform, methylene chloride, tetrahydrofuran, etc. The preferable solvents have low eluent strength or are low on the polarity scale.

The weight ratio of polymer to be decolorized to amorphous silica can vary from about 1 to 500, preferably from 20 to 100. The average particle size of amorphous silica can vary from 0.01 to 500 microns. For an amorphous silica with small particle size, it is preferable to pass colored polymer or its solution through the column under pressure.

Amorphous silica is a substantially dehydrated polymerized silica which can be considered as a condensation polymer of silicic acid. Amorphous silicas are further categorized as silica gel, precipitated silica, and fumed silica. These classifications are related to the method of preparation in each case.

Silica gel is generally prepared by the destabilization of an aqueous silicate solution to form a hydrogel. When the soluble silicate solution is acidified, a hydrosol results which later forms either a continuous silica hydrogel or a gelatinous precipitate, depending on concentration, degree of neutalization, and the method of mixing. In most procedures, the final gel is obtained by washing the hydrogel to free it of electrolytes, and drying to such an extent that the resulting gel is essentially free of water.

Precipitated silicas are also formed by destabilization of soluble silicates usually by acid neutralization. The destabilization is carried out in a solution which also contains polymerization inhibitors, such as inorganic salts, which cause an extremely fine precipitate of hydrated silica to be formed. This precipitate is then filtered, washed essentially free of occluded salts, and dried to the desired degree.

Fumed silica can be made by several processes. Some depend on volatilizing and recondensing silica while others depend on reacting silicon tetrachloride with hydrogen and oxygen.

The hydroxyl-terminated epihalohydrin liquid polymers referred to herein are easy to prepare and are useful in chain extension reactions. When the polymers are used in chain extension reactions, the chain-extending agent can be any polyfunctional compound which will react, under appropriate conditions with hydroxyl groups. Such compounds can be di- or poly-isocyanates, p-phenylene diisocyanate, 2,4-toluene diisocyanate, etc., or polyepoxides such as the diglycidyl ether of Bisphenol A, and the like. When the chain extending agent contains more than two functional groups, the product is generally a cross-linked product.

The hydroxyl-ended polymers of this invention may also be converted to useful polyester and polyamide block copolymers by the usual polyester and polyamide forming reactions. In addition, the polymers of this invention are useful in the preparation of polyurethane foams, which may be prepared as rigid, semirigid, or elastomeric foams.

The following examples demonstrate effectiveness of amorphous silica in decolorizing polymers of epihalohydrin.

EXAMPLES 1–3

In the examples described herein, the removal of color of a liquid homopolymer of epichlorohydrin was carried out by passing a toluene solution of the polymer through a column packed with amorphous silica. A 50-ml laboratory grade buret about 1.1 cm in diameter was used as a chromatographic column. The column was packed with amorphous silica, layers of 1-cm sea sand at both ends of silica, and about 1-cm of glass wool between the bottom layer of sea sand and the stopcock.

The liquid polymer was of an orange color having a number average molecular weight (Mn) of about 1,000 and a Brookfield viscosity of about 11,000 cps at 25° C. A 20 wt.% toluene solution of the liquid polymer was prepared.

As the polymer solution passed through the column by gravity, the color materials were adsorbed by the amorphous silica and formed a narrow orange band at the top of the silica column while colorless solution of the polymer was collected at the bottom. The colored band moved downward at an extremely slow rate.

Three types of amorphous silicas were studied:

1. Silica gel, desiccant (activated), grade 62, mesh size 60–200, obtained from Davison Chemical (Example 1).
2. Cab-O-Sil as a fumed silica, grade M-5, nominal particle size of 0.014 microns, obtained from Cabot Corporation (Example 2).
3. Hi-Sil 233 as a precipitated silica, obtained from PPG Industrials (Example 3).

The results are summarized in Table I, below:

TABLE I

|  | Silica Gel Silica gel, Grade 62 | Fimed Silica Cab-O-Sil, gr. M-5 | Precipitated Silica Hi-Sil 233 |
| --- | --- | --- | --- |
|  | Example No. | | |
|  | 1 | 2 | 3 |
| Wt. of silica, g | 2.8 | 0.6 | 1.2 |
| Height of Silica, cm | 9.1 | 7.5 | 4.8 |
| Wt. of liquid polymer fed, g | 93 | 63 | 48 |
| Wt. of colorless liquid polymer recovered, g | 91 | 59 | 48 |
| Time, hrs. | 29 | 76 | 79 |
| Height of color band, cm | 1.6 | 4.6 | 1.3 |

EXAMPLE 4

In the example described herein, silica gel was used to decolorize a liquid homopolymer of epichlorohydrin having a number average molecular weight (Mn) of about 3,000 and a Brookfield visocisty of about 170,000 cps at 25° C. The polymer was of a light brown color. The liquid polymer was dissolved in methylene chloride to yield a 20 wt.% solution. A 100-ml laboratory grade buret about 1.6 cm in diameter was used as a chromatographic column. The results are summarized in Table II, below:

TABLE II

| Wt. of silica gel (Grade 62) | 6.0 g |
| --- | --- |
| Height of silica gel | 8.9 cm |
| Wt. of liquid polymer fed, g | 50 |
| Wt. of colorless liquid polymer recovered, g | 48 |

We claim:

1. A method comprising passing a liquid polymer of an epihalohydrin that is of a yellow to dark brown color through a column of amorphous silica in order to essentially remove the color, said polymer haing molecular weight (Mn) in the range of about 250 to 50,000.
2. Method of claim 1 wherein said polymer is selected from homopolymers and copolymers of epihalohydrins and cyclic ethers containing 2 to 10 carbon atoms, amount of epihalohydrins in the copolymers being 1 to 99 weight parts.
3. Method of claim 2 wherein said epihalohydrin is epichlorohydrin, said copolymers contain 5 to 90 weight parts epichlorohydrin, and said amorphous silica is silica gel.
4. Method of claim 2 wherein said polymer is a hydroxyl terminated liquid polymer prepared in the presence of a catalytic amount of a cationic catalyst having Brookfield viscosity of less than 16,000 Pa.S at operating temperature.
5. Method of claim 4 wherein said polymer is a reaction product that is prepared in presence of water or a polyol and in presence of a catalytic amount of a trialkyl oxonium salt of an $HMF_6$ acid wherein M is an element selected from the group consisting of phosphorus, arsenic and antimony.
6. Method of claim 5 wherein amount of water or said polyol is about 0.03 to 15 parts by weight per 100 parts by weight of the monomer(s) polymerized.
7. Method of claim 6 wherein said polymer is a hydroxyl-terminated liquid homopolymer of epichlorohydrin having a yellow to dark brown color before contact with amorphous silica which becomes water-clear after treatment, weight ratio of said polymer to said silica is in the range of about 20 to 100.
8. Method of claim 7 wherein said homopolymer has molecular weight of about 500 to 10,000 and said polymer or its solution is passed through silica gel by gravity or under pressure.
9. Method of claim 8 wherein said polymer is dissolved in a solvent in order to reduce its viscosity sufficiently to facilitate its passage through amorphous silica and said amorphous silica is silica gel.
10. Method of claim 8 wherein said polymer is a homopolymer of epichlorohydrin having molecular weight of about 1000 to 3000 which is dissolved in toluene or methylene chloride, wherein said amorphous silica is selected from silica gel, precipitated silica and fumed silica having a particle size less than 500 microns and wherein physical properties of said polymer remain essentially unchanged after treatment with said amorphous silica.

* * * * *